United States Patent Office
3,453,950
Patented July 8, 1969

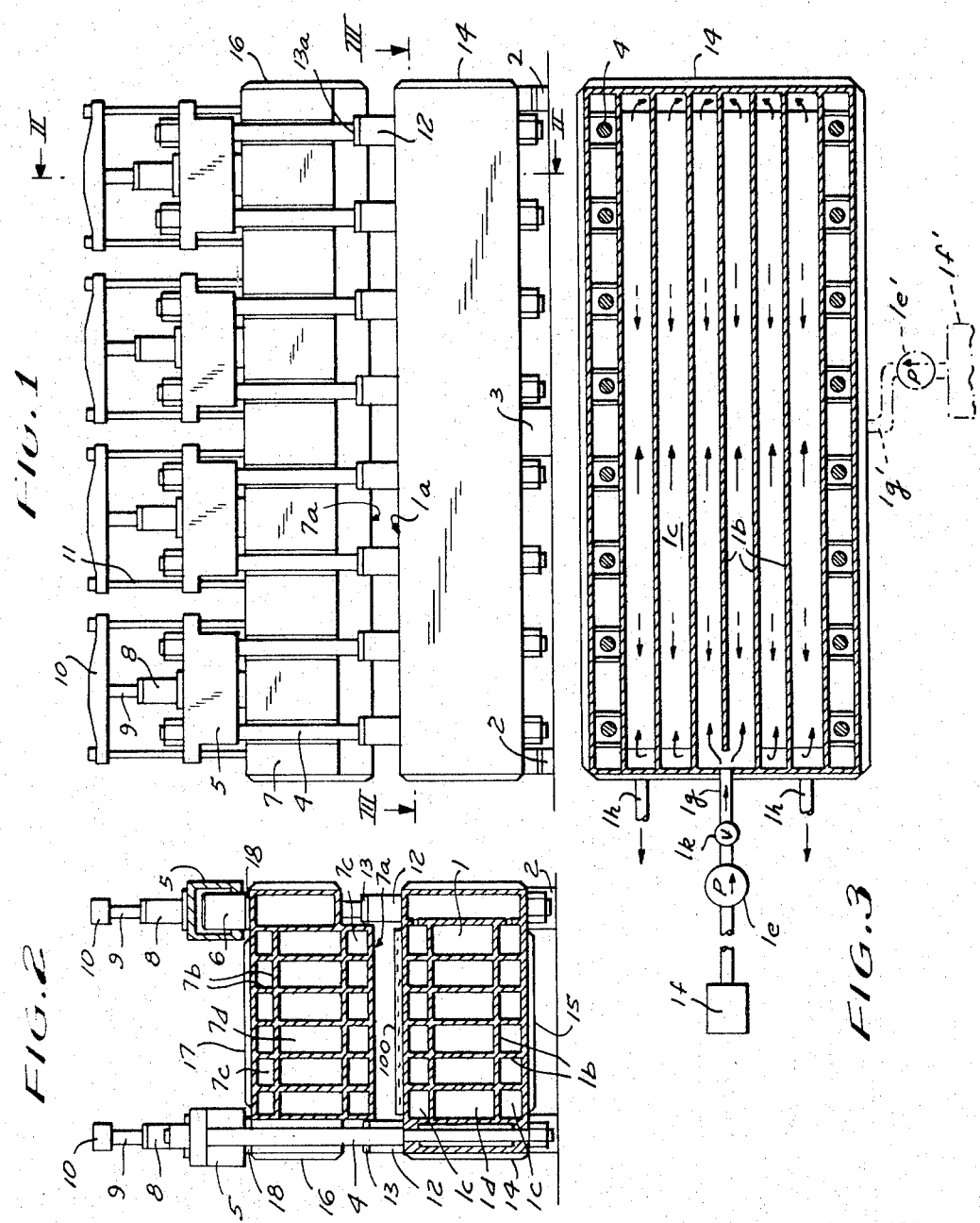

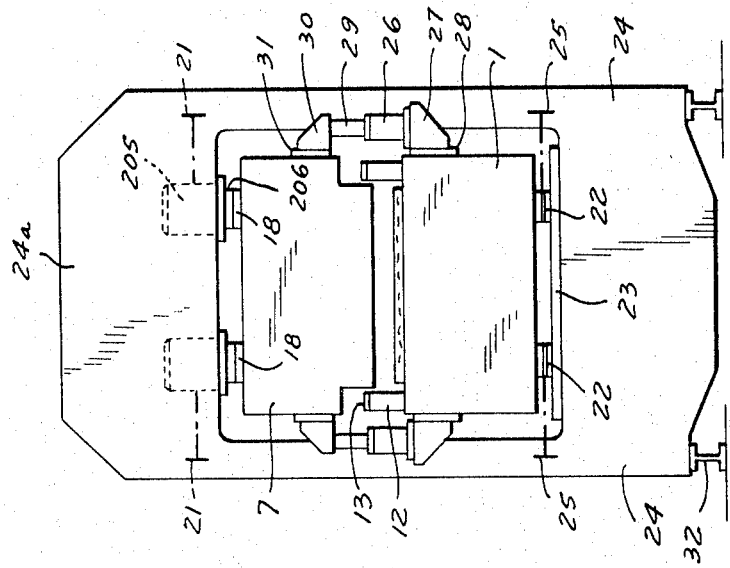
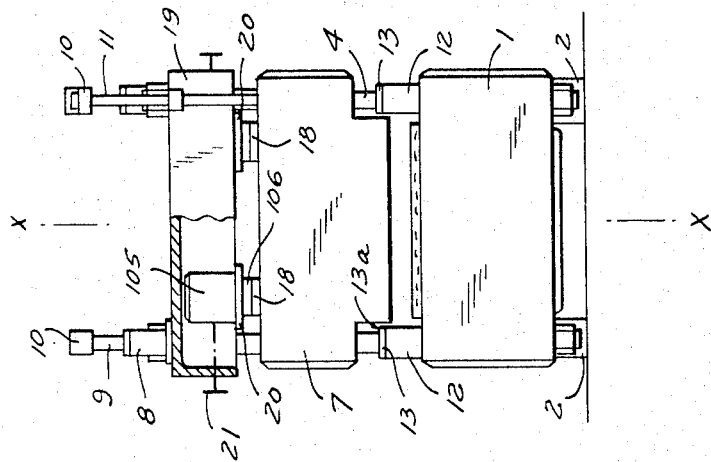

1

3,453,950
PRESS
Heinrich Pfeiffer, Eppingen, Baden, Germany, assignor to J. Dieffenbacher GmbH, Eppingen, Baden, Germany
Filed July 25, 1966, Ser. No. 567,774
Claims priority, application Germany, July 27, 1965,
D 47,835
Int. Cl. B30b 15/34, 7/02, 1/00
U.S. Cl. 100—93                    20 Claims

ABSTRACT OF THE DISCLOSURE

A press, particularly a single-storey hydraulic laminating press including a pair of substantially box-shaped platens having partition means dividing the interior thereof in a plurality of channels, at least one of the platens being movable toward and away from the other platen and the platens having adjacent heat- and pressure-transmitting external surfaces, operating means for moving the one platen toward and away from the other platen, and heating means including means for circulating a heating fluid through the channels.

---

The present invention relates to presses in general, and more particularly to improvements in hydraulic presses of the type which may be utilized in laminating operations, for example, in the production or shaping of fiberboard, plywood and similar multiple-layer structures whose layers are bonded to each other by the application of heat and/or pressure.

It is an important object of my invention to provide a hydraulic press which is constructed and assembled in such a way that the likelihood of non-uniform compression of plate-like workpieces is reduced to a minimum and that eventual variations in the thickness of such workpieces are not due to inaccuracies in the construction and/or machining of the parts which come in contact with the workpieces but solely or mainly to the characteristics of treated material.

Another object of the invention is to provide novel and improved platens which may be utilized in a hydraulic laminating press.

A further object of the invention is to provide a novel heating system for the platens of a hydraulic laminating press.

An additional object of the instant invention is to provide a novel system of spacers or distancing elements which may be utilized in the improved press.

Still another object of the invention is to provide a press wherein the number of surfaces which must be precision-finished to insure even distribution of compressive stresses is reduced to a minimum with attendant reduction of potential causes of uneven heating and/or compression of workpieces.

A concomitant object of the invention is to provide the improved press with platens which are constructed, mounted and heated in such a way that they undergo negligible deformation during the application of heat and pressure to blanks of fiberboard or analogous plate-like workpieces.

A further object of the invention is to provide a press wherein the platens are effectively insulated from the remaining parts to prevent uncontrolled exchange of heat.

Briefly stated, one feature of my invention resides in the provision of a press, particularly a single-storey hydraulic laminating press, which comprises a pair of hollow substantially box-shaped platens at least one of which is movable toward and away from the other platen, external heat- and pressure-transmitting surfaces provided directly on the two platens adjacent to each other so that two or more layers of plastic, fibrous or ligneous material may be bonded to each other in response to the application of heat and pressure by such external surfaces, operating means including cylinder and piston units for moving the one platen toward the other platen and so-called pullbacks (which preferably also include cylinder and piston units) for moving the one platen away from the other platen, and heating means for heating each platen from inside. The one platen is preferably located at a level above the other platen and the latter is stationary, i.e., it may be mounted directly on the floor or in a fixed frame.

In accordance with another feature of my invention, each of the platens is preferably provided with internal partitions or walls which subdivide its interior into a plurality of channels, and the heating means comprises one or more devices for circulating a hot fluid in such channels. The fluid may be circulated only in the interior of the respective platen or the heating means may comprise conduits extending from the platens and arranged to admit and to evacuate hot fluid from the channels. The channels preferably occupy at least the major part of the interior of each platen so that all or nearly all portions of each platen may be heated to substantially the same temperature to insure uniform expansion in response to heating.

The novel features which are considered as characteristic of the invention are set forth in particular in the appended claims. The improved press itself, however, both as to its construction and its mode of operation, together with additional features and advantages thereof, will be best understood upon perusal of the following detailed description of certain specific embodiments with reference to the accompanying drawings, in which:

FIG. 1 is a schematic side elevational view of a laminating press for fiberboard or the like which embodies one form of my invention;

FIG. 2 is a transverse vertical section substantially as seen in the direction of arrows from the line II—II of FIG. 1;

FIG. 3 is a horizontal section as seen in the direction of arrows from the line III—III of FIG. 1;

FIG. 4 is an end elevational view of a second press, a portion of the operating means being broken away; and FIG. 5 is an end elevational view of a third press wherein the platens are accommodated in a frame.

Referring first to FIGS. 1 to 3, there is shown a single-storey press which comprises a stationary lower box-shaped platen 1 whose underside is supported on the floor by supporting means including a centrally located rigid support 3 and two or more yieldable supports or cushions 2. The support 3 is fixed in position with reference to the platen 1 but the supports 2 are preferably adjustable in a manner to be described in connection with FIG. 5. This lower platen 1 is formed with two rows of vertical openings or holes which receive upright guide means here shown as tie rods 4 extending well beyond the platen 1 to support hydraulic cylinders 5 forming part of the operating means for the press. The cylinders 5 accommodate pistons 6 which can be moved downwardly to thus displace a second box-shaped platen 7 in a direction toward the platen 1. The platen 7 is also formed with openings or holes for the tie rods 4 and the holes of the platens 1 and 7 are dimensioned in such a way that each of the platens can expand independently of the other platen. In other words, the tie rods 4 insure that the platens cannot perform excessive angular movements with reference to each other but each of these platens can expand in response to heating without influencing the expansion of the other platen.

The operating means for the press further comprises a so-called pullback serving to move the upper platen 7 in a direction upwardly and away from the lower platen 1. This pullback comprises hydraulic cylinders 8 mounted on the cylinders 5 and accommodating pistons 9 whose upper ends are connected to traverses 10 provided with pairs of upright rods 11 affixed to the upper platen 7. The cylinders 5 are secured to the upper ends of the tie rods 4. The cylinders 8 will receive hydraulic fluid when the valves permitting escape of fluid from the cylinders 5 are open so that the pistons 9 can move the traverses 10 upwardly in order to move the platen 7 away from the platen 1.

The median portions of some or all of the tie rods 4 carry spacer means each of which includes a carrier here shown as a sleeve 12 resting on the lower platen 1 and one or more distancing rings 13 whose top faces 13a will determine the minimum distance between the two platens by abutting against the upper platen 7 when the latter is caused to move downwardly. It will be seen that the spacer means 12, 13 are offset from the space between the elongated heat- and pressure-transmitting surfaces 1a, 7a of the platens 1 and 7, at least when the platen 7 has been moved downwardly to such an extent that the distance between the surfaces 1a, 7a approaches the aforementioned minimum distance. Each ring 13 may comprise two or more relatively movable portions or sections so that such rings may be readily removed or added to select the minimum distance between the platens.

In order to prevent undesirable exchange of heat between the upper platen 7 and the operating means, the undersides of the pistons 6 are attached to bodies 18 of heat insulating material. Such bodies may consist of cooled disks or analogous cooling elements.

At least some or all of the additional exposed surfaces on the platens 1 and 7 (i.e., all external surfaces other than aforementioned surfaces 1a, 7a) are preferably provided with layers 14, 15 and 16, 17 of heat insulating material to prevent uncontrolled radiation of heat.

The manner in which the platens 1 and 7 are heated from inside is shown in FIGS. 2 and 3. Each of these platens is provided with internal partitions 1b, 7b which divide its interior into a plurality of elongated channels 1c, 7c. The centrally located channels 1d, 7d may but need not communicate with the channels 1c, 7c, depending upon whether the hot fluid which heats the platens is circulated through the entire interior or only through the channels 1c, 7c of the respective platens. The channels 1d, 7d will receive a hot fluid if the platens 1 and 7 should accumulate very large quantities of heat energy and/or if the temperature of these platens should fluctuate within a very narrow range, i.e., if the heating system of the press should compensate without appreciable delay for all such losses in heat energy which arise when the exposed surfaces 1a, 7a are brought into heat- and pressure-transmitting engagement with a laminated workpiece 100.

FIG. 3 shows that the upper horizontal channels 1c in the lower platen 1 extend longitudinally of the exposed surface 1a. The lower channels 7c of the upper platen 7 also extend longitudinally of the exposed surface 7a.

FIG. 3 shows further that the heating means comprises a pump 1e which draws hot fluid from a source 1f and circulates such fluid in the channels 1c. The solid-line arrows indicate the direction of fluid flow in the upper channels 1c and the broken-line arrows show the direction of fluid flow in the lower channels 1c. Thus, certain upper channels 1c admit hot fluid to certain lower channels 1c and certain lower channels 1c convey fluid to certain upper channels 1c. This insures substantially uniform heating of the entire platen 1. The heating means further comprises a second pump (not shown) which draws hot fluid from the source 1f (or from a second source) and circulates such fluid in the channels 7c of the upper platen 7. If desired, the heating means can comprise two or more pumps for each of the platens 1 and 7, and such pumps may admit hot fluid at the longitudinal ends and/or in the central portions of the respective platens. The fluid admitting conduit means 1g and the fluid evacuating conduit means 1h shown in FIG. 3 extend from the lower platen 1 because the pump 1e and the source 1f are located externally of this platen. However, it is equally within the purview of my invention to install the pump 1e in the interior of the platen 1 and to simply circulate the fluid in the channels 1c or 1c, 1d. In such presses, the platen 1 and/or 7 must be equipped with one or more built-in electric heaters to maintain the circulating fluid at a desired temperature.

A modified heating means whose fluid-admitting conduit means 1g' are located substantially midway between the longitudinal ends of the platen 1 is indicated in FIG. 3 by dot-dash lines. This heating means also comprises one or more sources 1f' of hot fluid and one or more circulating pumps 1e'. The heating means for the upper platen 7 may be analogous to or identical with the heating means for the platen 1.

Especially if the platen 1 and/or 7 is combined with a heating means which comprises two or more pumps (1e or 1e') serving to introduce a heating fluid into different zones of the interior of the respective platen, such heating means preferably comprise control means (for example, suitable valves one of which is shown at 1k in FIG. 3) to regulate the heating action so that selected portions of at least one of the external surfaces 1a, 7a may be maintained at different temperatures. For example, the central portions of the surfaces 1a, 7a may be heated to a temperature which is higher than the temperature of the remainder of such surfaces, i.e., the surface portions at the longitudinal ends and along the front and rear sides of the platens 1 and 7.

The importance of heating certain portions of the exposed surfaces 1a, 7a to a higher temperature will be readily understood by considering that the workpiece 100 shown in FIG. 2 may consist of several layers or strata which are to be bonded to each other. The fluid admitted by the pump 1e of FIG. 3 will enter the two centrally located upper channels 1c and then flows into a pair of lower channels 1c whence it returns into a pair of upper channels located at the opposite sides of the channels which are in direct communication with the conduit 1g. Thus, the central portion of the surface 1a, located between the two rows of tie rods 4, will be heated to a higher temperature and the portions which are nearer to the tie rods 4 will be heated to a lower temperature. Since the platens 1 and 7 must expel moisture from the workpiece 100, the evaporation of moisture in the central portion of the workpiece will begin first and the vapors will be expelled via the shortest distance between the central portion of the workpiece and the edges of the surfaces 1a, 7a.

In the manufacture of fiberboards and other types of laminated structures, delayed evacuation of moisture from the centrally located region of the workpiece often results in the formation of depressions (called pools) which must be eliminated by extensive secondary treatment, i.e., by planing, grinding and analogous material removing operations. It was found that the formation of such depressions is prevented if the centrally located region of the workpiece is heated more intensively than the regions which are nearer to the edges of the workpiece. The heating means of FIG. 3 is capable of such selective heating of the exposed surface 1a. In order to insure even more accurate selective heating of the surfaces 1a and 7a, each of the channels 1c and 7c which are adjacent to such surfaces may consist of two or more sections which are sealed from each other and are connected to different sources of heating fluid in each of which the fluid is maintained at a different temperature.

The fluid which is circulated in the channels of the platens 1 and 7 may be oil, water, air or another suitable liquid or gaseous medium. For example, and if the heating medium is an oil which, when heated to a temperature of about 200° C., does not take up any appreciable pressures, such medium may be admitted first into the centrally located channels 1c or 7c adjacent to the exposed surface 1a or 7a. The oil is then conveyed from the platen 1 or 7 and is admitted into the centrally located channels adjacent to the other exposed surface (7a or 1a). From thereon, the oil flows to the channels 1c and 7c which are remote from the surfaces 1a, 7a, thereupon into some or all of the remaining channels 1c, 7c which are adjacent to the surfaces 1a, 7a, and so on, to heat the platens in their entirety but in such a way that selected portions of the surfaces 1a, 7a are heated more intensively than the remaining portions of such surfaces. In other words, heating of the platens 1 and 7 can be carried out in such a way that a single stream of heating medium is caused to flow through the channels 1c and 7c in such sequence that selected portions of the surfaces 1a, 7a are heated to different temperatures. To my knowledge, such selective heating of different portions of heat- and pressure-transmitting surfaces in laminating presses is novel and is fully effective to eliminate the formation of aforementioned depressions.

As stated before, the heating means for the platens 1 and 7 may also comprise two or more sources of heating medium in each of which the respective medium is maintained at a different temperature. For example, and referring to FIG. 3, the pump 1e could be utilized to admit hot oil to the two centrally located upper channels 1c and the heating means can comprise two or more additional pumps to admit cooler oil to the upper channels 1c which are nearer to the tie rods 4. The temperature of oil in all of the upper channels 1c can be the same once the central portion of the workpiece 100 is relieved of such moisture which would be likely to cause the formation of a depression. In other words, the temperature of oil in the centrally located channels 1c which receive such oil from the pump 1e can be reduced to normal laminating temperature prior to actual opening of the press. Also, and as mentioned hereinbefore, the channels 1c and 7c which are adjacent to the surface 1a and 7a may be subdivided into sections which can be connected with different sources of fluid in each of which the fluid is maintained at a given temperature so that only such portions of the workpieces which are likely to develop depressions will be heated to an elevated temperature.

The regulation of the heating action should be effective at least during that interval which elapses between closing of the press and the start of polymerization. The length of such interval is normally about 2½ minutes. The press remains closed for an additional interval of 2–3 minutes and, during such additional interval, all of the channels 1c and 7c may contain fluid at normal laminating temperature. Such control of the heating means insures that the central portion of the workpiece is overheated during the first stage of a laminating operation to transform moisture into vapors which are expelled toward the edges of the workpiece with a certain amount of additional pressure.

In many instances, the provision of channels 1c and 7c which extend along the full length of the surfaces 1a and 7a, combined with heating means which can change the temperature of heating fluid, suffices to insure any desired heating action upon selected portions of such surfaces.

Referring to FIG. 4, there is shown a laminating press which comprises modified operating means including crossheads 19 which are affixed to the tie rods 4 and accommodate adjustable cylinder and piston units 105, 106. The crossheads 19 are located at a level above the upper platen 7 and carry spindles 21 or analogous adjusting means for changing the position of cylinders 105 with reference to a central vertical symmetry plane X—X of the press. The construction of the pullback including the cylinders 8, pistons 9, traverses 10 and rods 11 is the same as described in connection with FIGS. 1 to 3.

The cylinders 105 are formed with flanges 20 which are slidable in ways provided in the respective crossheads 19 toward and away from the symmetry X—X. The arrangement is preferably such that each crosshead 19 accommodates two cylinders 105, one for each half of the upper platen 7. The cylinders 8 of the pullbacks are fixedly secured to the crossheads 19.

The crossheads 19 are mounted on the tie rods 4 with at least some clearance so that the tie rods can expand in response to exchange of heat with the platen 1 and/or 7. Such clearance may be in the range of one or more tenths of a millimeter.

Referring finally to FIG. 5, there is shown a third laminating press which comprises a stationary frame 24 surrounding the platens 1 and 7 and including one or more horizontal beams 24a which extend across and are located above the upper platen 7.

The frame 24 carries a plate 23 for two longitudinally extending yieldable supports 22. These supports may be shifted by adjusting means here shown as spindles 25 which are mounted in the frame 24 and each of which can move the respective support along the underside toward or away from the central vertical symmetry plane of the lower platen 1. The central portion of this lower platen 1 is non-rotatably affixed to the frame 24, for example, by means of a rigid supporting member such as the member 3 shown in FIG. 1.

The pullback comprises registering brackets 27, 30 provided on and extending laterally from the platens 1, 7 and cylinder and piston units 26, 29 operating between each pair of registering brackets. Bodies 28, 31 of heat insulating material are interposed between the brackets 27, 30 and the platens 1 and 7. Such bodies may be constituted by disk-shaped or plate-like cooling elements.

The beam 24a of the frame 24 accommodates pairwise arranged cylinder and piston units 205, 206 which are shiftable by spindles 21. The flanges 20 of the cylinders 205 are slidable in suitable ways provided therefor in the beam 24a. Each such pair of cylinder and piston units includes a first unit located above the left-hand half and a second unit located above the right-hand half of the platen 7.

The frame 24 rests on profiled metallic bars 32 mounted on a suitable foundation.

The advantages of my improved press will be more readily appreciated upon perusal of the following discussion of presently known presses for fiberboard and like laminated workpieces. In such conventional presses, the surfaces which come into actual contact with the workpieces are not provided on the platens but rather on separate heating plates which are mounted on the respective platens. Each heating plate is carried by a grate and each such grate is separated from the associated platen by a cooling plate. The grates prevent excessive transfer of heat from the heating plates to the respective cooling plates. In the manufacture of such conventional presses, the finishing of platens, cooling plates, grates and heating plates requires a series of planing, grinding, polishing or similar smoothing operations. Thus, the adjoining surfaces of the platens are planed or otherwise smoothed in a first operation, both sides of the cooling plates are smoothed in a second operation, both sides of each grate are smoothed in a third operation, and both sides of each heating plate are smoothed in a fourth operation. In other words, seven precision-finished surfaces are disposed between each side of a workpiece and the respective platen. Some inaccuracies in the finish of such surrfaces are unavoidable. Minor or major inaccuracies in the smoothness and flatness of such surfaces are compounded so that it can happen that as many as fourteen inaccuracies are compounded to bring about highly unsatisfactory compression of workpieces between two surfaces which are not parallel to each other. In my improved press, such compounding of inaccuracies is not possible because the surfaces 1a, 7a are provided directly on the platens 1 and 7. Such construction of the platens reduces the initial cost and also insures that the two surfaces can subject the workpieces to more satisfactory compression.

Another drawback of presently known laminating presses is due to the fact that the designers of such presses attempt to prevent or to reduce the exchange of heat between the surfaces which come in actual contact with the workpieces and the respective platens. The provision of the aforementioned grates is intended to reduce the transfer of heat from the heating plates to the cooling plates. However, the cooling plates should not prevent transfer of a certain amount of heat to the platens because this could result in excessive corrosion in the regions where the grates contact the heating and cooling plates. In other words, both platens are subjected to considerable heating which brings about expansion and resulting deformation of the platens. Such deformation is not uniform because the portions of platens which are nearer to the respective cooling plates receive more heat than the remainder of each platen. Thus, the underside of the lower platen and the upper side of the upper platen will not be heated at all while the upper side of the lower platen and the underside of the upper platen will receive a considerable amount of heat energy. The deformation of platens contributes to non-uniform compression of the workpieces and brings about inaccuracies in the thickness of workpieces which are added to inaccuracies resulting from unsatisfactory finish of surfaces on the component parts of conventional presses.

In accordance with my present invention, such inaccuracies in the wall thickness of workpieces which develop in conventional presses due to non-uniform heating of the platens are avoided in a very simple way by substantially uniform heating of all portions of each of the platens 1 and 7. The provision of the aforementioned channels 1c, 7c or 1c and 7c, 7d insures that each portion of the respective platen can be heated to a desired temperature and that heat energy stored in the platens can be transmitted directly to the workpieces 100 so that losses in heat energy are reduced to a minimum. The walls of the platens 1 and 7 may be welded to each other or the platens may be produced by casting. Each platen is strong enough to reduce or to eliminate flexing at operating pressures. Also, the aforementioned uniform heating of the platens insures that the expansion of each platen is uniform, i.e., that the deformation of platens in response to unequal heating is negligible. Uniform heating of the platens is further enhanced by the provision of the aforementioned heat insulating means 14–17 which insure that the platens can store exceptionally large quantities of heat energy and that the heating action takes place without the generation of any appreciable internal stresses. The clearances between the tie rods 4 and the platens 1, 7 and crossheads 19 allow for uniform expansion of both platens in response to heating. Such uniform expansion is further facilitated by the provision of the yieldable supporting members 2 or 22. The upper platen 7 is simply suspended on the pullback and the tie rods 4 merely insure that the platen 7 cannot change its angular position with reference to the lower platen 1. The spindles 21, 25 will be manipulated when the operators desire to control flexing of the platens and to thus insure that each portion of the workpiece 100 will have the same thickness. This results in considerable reduction in the amounts of material which must be removed from the surfaces of workpieces 100 subsequent to removal from the press.

Another serious drawback of presently known laminating presses is that the spacer means which determine the minimum distance between the heating plates consist of strips which are placed onto the lower heating plate and are engaged by the upper pressing plate when the upper platen moves downwardly. It was found that, when the upper platen approaches the workpiece, air which is expelled along the upper surface of the workpiece invariably entrains some material of the workpiece and such material deposits on the strips which causes additional inaccuracies in the thickness of the finished workpiece. The deposition of material on the spacer strips takes place even if the press is closed very slowly because the air which is expelled along the underside of the upper heating plate invariably entrains some solid particles. Therefore, laminated bodies which are pressed in such conventional apparatus must be subjected to time-consuming and expensive secondary treatment, for example, in a grinding machine, to remove considerable amounts of material until the two main surfaces of the laminated body are located in two truly parallel planes. Such secondary treatment can result in removal of material in the range of between 5 and 12 percent by weight.

My improved spacer means is constructed and assembled in such a way that the deposition of material on the top faces 13a of the distancing rings 13 is either non-existent or so minimal that it cannot influence the thickness of the workpiece. This is due to the fact that the faces 13a are offset with reference to the exposed surface 7a when the latter approaches the workpiece 100 and expels air from the space between the workpiece and the upper platen. In other words, the faces 13a are not located in the path of air currents which are expelled along the upper side of the workpiece 100 when the upper platen 7 descends. Consequently, the platen 7 may be lowered at a high speed and even such high-speed operation of the press will not result in deposition of solid particles on the rings 13. The sleeves 12 may be constructed and mounted in such a way that they also contribute to retention of the upper platen 7 against angular displacement without, however, positively guiding the upper platen during its movements along the tie rods 4.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the following claims.

What is claimed as new and desired to be protected by Letters Patent is:

1. In a press, particularly in a single-storey hydraulic laminating press, a pair of substantially box-shaped platens having adjacent heat- and pressure-transmitting surfaces, one of said platens being located at a level above the other platen and being movable toward and away from the latter, said other platen being stationary and having an underside; operating means for moving said one platen toward and away from said other platen; heating means for heating each of said platens from inside; and supporting means including a rigid support disposed substantially centrally of said underside of said other platen and a plurality of yieldable supports engaging said underside at points spaced from said rigid support.

2. In a press, particularly in a single-storey hydraulic laminating press, a pair of substantially box-shaped platens, at least one of said platens being movable toward and away from the other platen and said platen having adjacent heat- and pressure-transmitting external surfaces; operating means for moving said one platen toward and away from the other platen, said operating means including pullback means for moving said one platen away from said other platen; cooling elements interposed between said pullback means and at least said one platen; and heating means for heating each of said platens from inside.

3. In a press, particularly in a single-storey hydraulic laminating press, a pair of substantially box-shaped platens, at least one of said platens being movable toward and away from the other platen and said platens having adjacent heat- and pressure-transmitting external surfaces; operating means for moving said one platen toward and away from the other platen, said operating means comprising pullback means for moving said one platen away from said other platen and including registering brackets provided laterally on said platens, cylinder and piston units operating between said registering brackets, and cooling elements interposed between said brackets and the respective platen; and heating means for heating each of said platens from inside.

4. In a press, particularly in a single-storey hydraulic laminating press, a pair of substantially box-shaped platens having each an elongated top and bottom wall, a pair of elongated side walls, a pair of end walls and partition means in the interior of each box-shaped platen and subdividing the interior thereof in a plurality of channels extending in direction of elongation of said top and bottom walls, at least one of said platens being movable toward and away from the other platen and said platens having adjacent heat- and pressure-transmitting external surfaces; operating means for moving said one platen toward and away from said other platen; and heating means comprising means for circulating a heating fluid through said channels, said means for circulating heating fluid communicating with channels extending longitudinally along a central portion of said heat- and pressure-transmitting surfaces and said channels being arranged to guide the fluid after having passed along said central channel portion into channel portions to opposite sides of said central channel portion so that a central longitudinally extending portion of each of said surfaces is heated to a higher temperature than portions of said surfaces adjacent to said side walls of said platens.

5. A structure as set forth in claim 4, wherein said partition means includes a pair of walls extending substantially parallel to and respectively spaced from said top and bottom walls between said side walls, and a plurality of walls extending substantially normal to said top and bottom walls between the latter.

6. A structure as set forth in claim 5, wherein said pair of walls end short of said end walls so that fluid passing through channels along said top wall of each platen may pass along said end walls into channels extending along said bottom wall.

7. A structure as set forth in claim 4, wherein each of said platens has a plurality of additional external surfaces and further comprising heat insulating means provided around at least the majority of said additional external surfaces.

8. A structure as set forth in claim 4, further comprising guide means for holding said platens against angular displacement relative to each other with such clearance that each of said platens can expand independently in response to heating.

9. A structure as set forth in claim 8, wherein said one platen is located at a level above said other platen and wherein said guide means comprises upright tie rods secured to said other platen and slidably supporting said one platen with sufficient clearance to permit expansion of said one platen independently of said other platen, said operating means comprising pullback means including elements connected with and supporting said one platen in suspended position.

10. A structure as set forth in claim 9, wherein said tie rods extend with clearance through openings provided in said other platen.

11. A structure as set forth in claim 9, wherein said operating means further comprises at least one crosshead carried by said tie rods above said one platen and cylinder and piston units provided in said crosshead and arranged to move said one platen downwardly toward said other platen.

12. A structure as set forth in claim 11, wherein said crosshead is carried by said tie rods with at least some clearance so that such tie rods can expand in response to exchange of heat with at least one of said platens.

13. A structure as set forth in claim 12, wherein the clearance between said tie rods and said crosshead is in the range of a fraction of a millimeter.

14. A structure as set forth in claim 4, further comprising a frame surrounding said platens, said one platen being located at a level above said other platen.

15. A structure as set forth in claim 14, wherein said operating means comprises pullback means including brackets provided laterally on said platens and cylinder and piston units disposed between the brackets of said platens and arranged to move said one platen upwardly and away from said other platen.

16. A structure as set forth in claim 13, further comprising yieldable supporting means provided between said frame and said other platen, said supporting means being disposed below said other platen.

17. A structure as set forth in claim 16, further comprising adjusting means for changing the position of said supporting means with reference to said frame and said other platen.

18. A structure as set forth in claim 17, wherein said other platen comprises two mirror symmetrical halves and wherein said supporting means comprises at least one yieldable supporting member disposed below each of said halves.

19. A structure as set forth in claim 13, wherein said frame comprises a beam located above said one platen and said operating means comprises cylinder and piston units accommodated in said beam and arranged to move said one platen downwardly toward said other platen.

20. A structure as set forth in claim 19, wherein said one platen comprises a pair of mirror symmetrical halves and wherein said cylinder and piston units comprise at least one unit for each of said halves, and further comprising adjusting means for changing the position of such units with reference to said beam.

References Cited

UNITED STATES PATENTS

| | | | |
|---|---|---|---|
| 2,090,377 | 8/1937 | Schnuck. | |
| 2,217,652 | 10/1940 | Quick | 100—199 X |
| 2,300,339 | 10/1942 | Camerota | 100—93 X |
| 2,627,290 | 2/1953 | Berthelsen. | |
| 2,874,751 | 2/1959 | Norton | 18—17 X |
| 3,236,176 | 2/1966 | Fischer | 100—93 |
| 3,241,189 | 3/1966 | Siempelkamp | 100—93 X |
| 3,333,447 | 8/1967 | Alspaugh. | |

FOREIGN PATENTS 489,566  1/1953  Canada.

PETER FELDMAN, *Primary Examiner.*

U.S. Cl. X.R.

18—17; 100—199, 214; 144—281